United States Patent
Kajiwara et al.

(10) Patent No.: US 9,083,266 B2
(45) Date of Patent: Jul. 14, 2015

(54) FUEL CELL SYSTEM AND CONTROL METHOD THEREFOR

(75) Inventors: Shigeto Kajiwara, Okazaki (JP); Hiroaki Mori, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/129,431

(22) PCT Filed: Jun. 26, 2012

(86) PCT No.: PCT/IB2012/001271
§ 371 (c)(1),
(2), (4) Date: Dec. 26, 2013

(87) PCT Pub. No.: WO2013/001343
PCT Pub. Date: Jan. 3, 2013

(65) Prior Publication Data
US 2014/0132193 A1     May 15, 2014

(30) Foreign Application Priority Data
Jun. 28, 2011    (JP) ................................ 2011-142546

(51) Int. Cl.
*H02P 4/00*     (2006.01)
*B60L 1/00*     (2006.01)
(Continued)

(52) U.S. Cl.
CPC . *H02P 4/00* (2013.01); *B60L 1/003* (2013.01); *B60L 3/0046* (2013.01); *B60L 11/1803* (2013.01); *B60L 11/1887* (2013.01); *B60L 15/2045* (2013.01); *B60L 2210/14* (2013.01); *B60L 2210/40* (2013.01); *B60L 2240/423* (2013.01); *B60L 2240/547* (2013.01); *B60L 2250/28* (2013.01); *Y02T 10/642* (2013.01);
(Continued)

(58) Field of Classification Search
CPC .......................................................... H02P 4/00
USPC .......................................... 318/500, 494, 139
See application file for complete search history.

(56) References Cited

U.S. PATENT DOCUMENTS 6,583,519 B2 *   6/2003   Aberle et al. ................. 307/10.1
7,438,984 B2 *   10/2008   Aoyagi et al. ................ 429/430
(Continued)

FOREIGN PATENT DOCUMENTS

CN           101911362 A    12/2010
EP            1928078 A1     6/2008
(Continued)

*Primary Examiner* — David S Luo
(74) *Attorney, Agent, or Firm* — Kenyon & Kenyon LLP

(57) ABSTRACT

A fuel cell system (10) includes: a motor (16); a fuel cell (11) and an electrical storage device (13) connected to the motor (16) in parallel with each other; a first voltage converter (12) between the motor (16) and the fuel cell (11); a second voltage converter (14) between the motor (16) and the electrical storage device (13); a load circuit between the motor (16) and both the first (12) and second (14) voltage converters; and a control unit (20). The control unit (20) stops boost operation of the first voltage converter (12) when conditions VFC>VM_min and VFC>VBAT+a whereas the control unit (20) prohibits a stop of the boost operation of the first voltage converter (12) when the conditions are not satisfied, wherein in the conditions, VFC is a fuel cell terminal voltage, VBAT is an electrical storage device terminal voltage and VM_min is a load circuit input terminal voltage, set to minimize a system loss while ensuring a torque required of the motor (16).

4 Claims, 6 Drawing Sheets

(51) Int. Cl.
*B60L 3/00* (2006.01)
*B60L 11/18* (2006.01)
*B60L 15/20* (2006.01)

(52) U.S. Cl.
CPC .......... *Y02T 10/7225* (2013.01); *Y02T 10/7241* (2013.01); *Y02T 10/7283* (2013.01); *Y02T 90/34* (2013.01)

(56) References Cited

U.S. PATENT DOCUMENTS

| | | | |
|---|---|---|---|
| 2007/0199747 | A1 | 8/2007 | Aoyagi et al. |
| 2007/0275276 | A1 | 11/2007 | Saeki et al. |
| 2009/0146493 | A1 | 6/2009 | Fujino et al. |
| 2010/0316922 | A1 | 12/2010 | Hamada et al. |

FOREIGN PATENT DOCUMENTS

| | | | |
|---|---|---|---|
| EP | 2226878 | A1 | 9/2010 |
| JP | 2007-209161 | A | 8/2007 |
| JP | 2007-318938 | A | 12/2007 |
| JP | 2009-163956 | A | 7/2009 |
| JP | 2009-165243 | A | 7/2009 |
| JP | 2009-165244 | A | 7/2009 |
| JP | 2009-193921 | A | 8/2009 |
| JP | 2009-277584 | A | 11/2009 |
| JP | 2010-045889 | A | 2/2010 |
| JP | 2010-124689 | A | 6/2010 |
| JP | 2010-273496 | A | 12/2010 |
| JP | 2010-277793 | A | 12/2010 |

* cited by examiner

FUEL CELL SYSTEM AND CONTROL METHOD THEREFOR

CROSS REFERENCE TO RELATED APPLICATION

This is a national phase application based on the PCT International Patent Application No. PCT/IB2012/001271 filed on Jun. 26, 2012, claiming priority to Japanese application No. 2011-142546 filed Jun. 28, 2011, the entire contents of both of which are incorporated herein by reference.

BACKGROUND OF THE INVENTION

1. Field of the Invention

The invention relates to a fuel cell system and control method therefore, which supply electric power, output from a fuel cell, to a motor.

2. Description of Related Art

There is known a system of this type, in which a fuel cell and an electrical storage device (such as a secondary battery) are connected in parallel with a motor, a boost DC-DC converter (hereinafter, referred to as "FC boost converter") is provided between the motor and the fuel cell and a boost DC-DC converter (hereinafter, referred to as "battery boost converter") is provided between the motor and the electrical storage device (for example, see Japanese Patent Application Publication No. 2007-318938 (JP 2007-318938 A)). Furthermore, there is known such a system that is configured to stop boost operation of the FC boost converter or battery boost converter depending on circumstances (for example, see Japanese Patent Application Publication No. 2007-209161 (JP 2007-209161 A), Japanese Patent Application Publication No. 2010-45889 (JP 2010-45889 A), Japanese Patent Application Publication No. 2010-124689 (JP 2010-124689 A), and the like).

In the thus configured existing systems, when boost operation of each of the above described converters is stopped without any discretion, voltage control in the system conversely collapses. This may lead to overcurrent or overvoltage in some cases.

SUMMARY OF THE INVENTION

The invention provides a fuel cell system and control method therefore, which solve the above described inconvenience.

A first aspect of the invention relates to a fuel cell system. The fuel cell system includes: a motor; a fuel cell; an electrical storage device; a first voltage converter; a second voltage converter; a load circuit; and a control unit. Electric power output from at least one of the fuel cell and the electrical storage device is supplied to the motor via the load circuit (for example, see Japanese Patent Application Publication No. 2009-165244 that is the related application of the applicant). Note that the fuel cell may be referred to as "fuel cell stack".

The fuel cell and the electrical storage device are connected to the motor in parallel with each other. The first voltage converter is a voltage converter (boost DC-DC converter) that is provided between the motor and the fuel cell, and boosts and outputs a terminal voltage of the fuel cell, input to the first voltage converter. Similarly, the second voltage converter is a voltage converter (boost DC-DC converter) that is provided between the motor and the electrical storage device, and boosts and outputs a terminal voltage of the electrical storage device, input to the second voltage converter. The load circuit is provided between the motor and both the first voltage converter and the second voltage converter. The control unit is provided so as to control operations of various units in the fuel cell system.

The control unit stops boost operation of the first voltage converter and directly transmits an output of the fuel cell to the load circuit when conditions (1) VFC>VM_min and a condition (2) VFC>VBAT+α are satisfied whereas the control unit prohibits a stop of the boost operation of the first voltage converter when at least any one of the condition (1) and the condition (2) is not satisfied, wherein in the conditions, VFC is the terminal voltage of the fuel cell, VBAT is the terminal voltage of the electrical storage device, VM_min is a load circuit input lower limit voltage, which is an input terminal voltage of the load circuit, set to minimize a loss in the fuel cell system while ensuring a torque required of the motor, and α is a constant of which the sign is positive.

When the condition (1) is satisfied, the terminal voltage of the fuel cell is higher than the load circuit input lower limit voltage (the input terminal voltage of the load circuit, set to minimize a loss in the fuel cell system while ensuring a torque required of the motor). Thus, in this case, it is possible to directly transmit the output of the fuel cell to the input terminal of the load circuit without boosting the terminal voltage of the fuel cell.

Here, "VBAT+α" in the condition (2) specifically corresponds to a lower limit voltage at or above which voltage control can be executed by the second voltage converter when the terminal voltage of the electrical storage device is VBAT ("boostable minimum voltage" in Japanese Patent Application Publication No. 2010-273496 that is the related application of the applicant). That is, when the condition (2) is satisfied, the output-side voltage of the second voltage converter is stably controllable with respect to the input-side voltage of the second voltage converter. Therefore, when the condition (2) is satisfied, even when the boost operation of the first voltage converter is stopped (that is, even when the input terminal voltage of the load circuit is not controlled by the first voltage converter), the input terminal voltage of the load circuit may be stably controlled by the second voltage converter.

Then, in the fuel cell system according to the first aspect of the invention, when the condition (1) and the condition (2) are satisfied, the boost operation of the first voltage converter is stopped. Then, the input terminal of the load circuit is electrically directly connected to the fuel cell. In addition, the output of the fuel cell may be directly transmitted to the input terminal of the load circuit without intervening switching operation of the first voltage converter.

Thus, with the fuel cell system according to the first aspect of the invention, having the above described configuration, a switching loss in the first voltage converter is reduced, thus improving the efficiency of the system. In addition, the input terminal voltage of the load circuit and the terminal voltage of the fuel cell directly electrically connected to the input terminal may be stably controlled by the second voltage converter.

On the other hand, when the condition (1) is not satisfied, it is necessary to boost the terminal voltage of the fuel cell. In addition, in the case where the condition (1) is satisfied but the condition (2) is not satisfied, when the first voltage converter is stopped, the output-side voltage of the second voltage converter is not stably controllable with respect to the input-side voltage of the second voltage converter. Therefore, when the first voltage converter is stopped in the case where the condition (2) is not satisfied, the input terminal voltage of the load circuit and the terminal voltage of the fuel cell directly electrically connected to the input terminal are not stably controlled.

Then, in the fuel cell system according to the first aspect of the invention, when at least any one of the condition (1) and the condition (2) is not satisfied, a stop of the boost operation of the first voltage converter is prohibited. At this time, the input terminal voltage of the load circuit is controlled through operation of the first voltage converter (and the second voltage converter).

A second aspect of the invention relates to a control method for a fuel cell system. The fuel cell system includes: a motor; a fuel cell and an electrical storage device that are connected to the motor in parallel with each other; a first voltage converter that is provided between the motor and the fuel cell and that boosts and outputs a terminal voltage of the fuel cell, input to the first voltage converter; a second voltage converter that is provided between the motor and the electrical storage device and that boosts and outputs a terminal voltage of the electrical storage device, input to the second voltage converter; and a load circuit that is provided between the motor and both the first voltage converter and the second voltage converter. The control method includes: supplying electric power, output from at least one of the fuel cell and the electrical storage device, to the motor via the load circuit; and stopping boost operation of the first voltage converter and directly transmitting an output of the fuel cell to the load circuit when conditions VFC>VM_min and VFC>VBAT+α are satisfied whereas prohibiting a stop of the boost operation of the first voltage converter when the conditions are not satisfied, wherein in the conditions, VFC is the terminal voltage of the fuel cell, VBAT is the terminal voltage of the electrical storage device, VM_min is a load circuit input lower limit voltage, which is an input terminal voltage of the load circuit, set to minimize a loss in the fuel cell system while ensuring a torque required of the motor, and α is a constant of which the sign is positive, and wherein VBAT+α corresponds to a lower limit voltage at or above which voltage control can be executed by the second voltage converter when the terminal voltage of the electrical storage device is VBAT.

In this way, with the fuel cell system and the control method therefore according to the aspects of the invention, having the above described configurations, the input terminal voltage of the load circuit and the terminal voltage of the fuel cell are appropriately controlled, and the appropriate efficiency of the system is achieved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described with reference to the accompanying drawings. Note that the description in the following embodiment just merely specifically describes an example of the aspect of the invention. Thus, as will be described later, of course, the aspect of the invention is not limited by the specific configuration of the embodiment described below. Various changes (modifications) to the present embodiment are collectively described in the last paragraphs.

System Configuration

Figure 1:
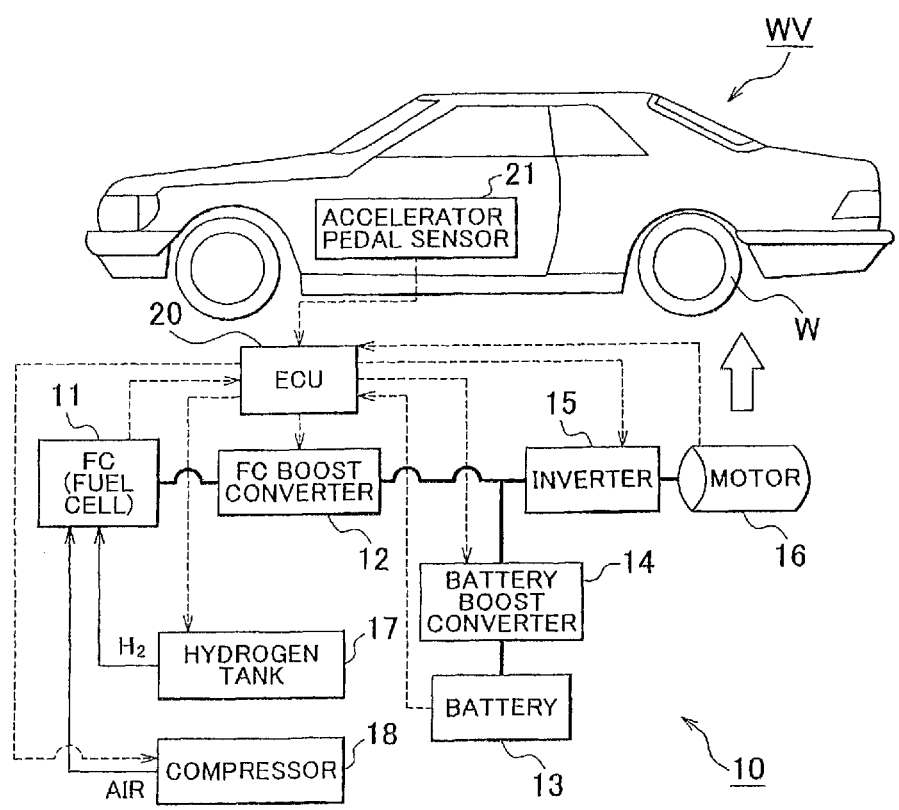
FIG. 1 is a view that shows the schematic configuration of a fuel cell system according to one embodiment of the invention and a vehicle equipped with the fuel cell system.

FIG. 1 is a view that shows the schematic configuration of a fuel cell system according to an embodiment of the invention and a vehicle WV equipped with the fuel cell system. The vehicle WV is equipped with the fuel cell system 10 according to the present embodiment. The fuel cell system 10 according to the present embodiment includes a fuel cell 11, an FC boost converter 12, a battery 13, a battery boost converter 14, an inverter 15, a motor 16, a hydrogen tank 17, a compressor 18 and a control unit 20. The fuel cell system 10 supplies electric power, output from the fuel cell 11 and/or the battery 13, to the motor 16 via the inverter 15, thus driving drive wheels W.

The fuel cell 11 is electrically connected to the inverter 15 via the FC boost converter 12. In addition, the battery 13 is electrically connected to the inverter 15 via the battery boost converter 14. The inverter 15 is provided between the motor 16 and both the FC boost converter 12 and the battery boost converter 14. The inverter 15 corresponds to a load circuit according to the aspect of the invention. That is, the fuel cell 11 and the battery 13 are connected in parallel with the inverter 15 and the motor 16.

Figure 2:
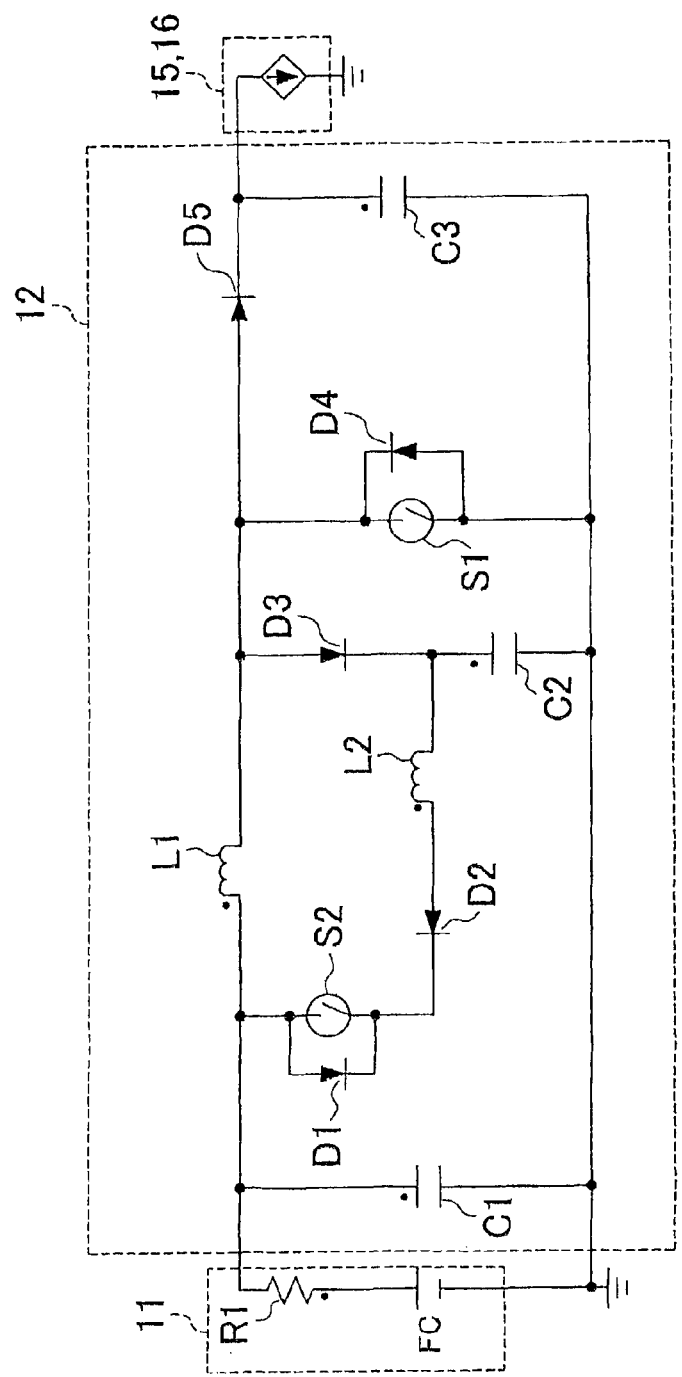
FIG. 2 is a view that shows the electrical circuit configuration of an FC boost converter shown in FIG. 1.

The FC boost converter 12 is a boost DC-DC converter, and is configured to be able to boost the terminal voltage of the fuel cell 11, input to the FC boost converter 12, and output the boosted voltage to the inverter 15. The FC boost converter 12 corresponds to a first voltage converter according to the aspect of the invention. FIG. 2 is a view that shows the electrical circuit configuration of the FC boost converter 12 shown in FIG. 1. Note that, in FIG. 2, for the sake of simplification of illustration, the battery 13 and the battery boost converter 14 are omitted.

As shown in FIG. 2, the FC boost converter 12 is configured to be able to change the boost ratio by adjusting the switching duty ratio of a switching element S1 during boost operation, and is configured to be able to directly transmit the terminal voltage of the fuel cell 11 to the inverter 15 via a coil L1 and a diode D5 during a stop of boost operation (note that a person skilled in the art is able to easily understand how the boost converter 12 specifically operates when he sees the electrical circuit configuration shown in FIG. 2, and, where necessary, see Japanese Patent Application Publication No. 2009-165244 (JP 2009-165244 A), or the like).

Referring back to FIG. 1, the battery boost converter 14 is a boost DC-DC converter, and is configured to be able to boost the terminal voltage of the battery 13, input to the battery boost converter 14, and output the boosted voltage to the inverter 15. The battery boost converter 14 corresponds to a second voltage converter according to the aspect of the invention.

The control unit (ECU) 20 is a so-called microcomputer that is used to control the operations of various portions in the fuel cell system 10. The control unit 20 includes a CPU, a ROM, a RAM, a backup RAM, an interface and a bidirectional bus that connects these devices. The ROM prestores routines (programs) executed by the CPU, tables (lookup tables, maps) consulted when the routines are executed, and the like.

The control unit 20 is electrically connected via the above described interface to various sensors. The various sensors include sensors (a current sensor, a voltage sensor, and the like) provided on the fuel cell 11 or the battery 13, a rotation speed sensor (not shown) provided on the motor 16, an accelerator pedal sensor 21, and the like. In addition, the control unit 20 is electrically connected to the FC boost converter 12, the battery boost converter 14, the inverter 15 and the motor 16 via the above described interface, and is configured to control the operations of these devices. Furthermore, the control unit 20 is electrically connected to a fuel gas supply system and an oxidation gas supply system, and is configured to control the operations of these systems. The fuel gas supply system includes an on-off valve (not shown) provided on the hydrogen tank 17, and the like. The oxidation gas supply system includes a compressor 18, and the like.

Outline of Operation of System

The control unit 20 calculates a total electric power required of the fuel cell system 10 (the total value of a vehicle running electric power and an auxiliary electric power) and determines the distribution of electric power output from the fuel cell 11 and electric power output from the battery 13 on the basis of the motor rotation speed, an accelerator pedal operation amount detected by the accelerator pedal sensor 21, and the like. In addition, the control unit 20 controls the fuel gas supply system and the oxidation gas supply system such that the amount of electric power generated by the fuel cell 11 coincides with a target electric power, and controls the FC boost converter 12 and the battery boost converter 14 to thereby control the operating points (terminal voltage and output current) of the fuel cell 11. Furthermore, the control unit 20 controls the output torque and rotation speed of the motor 16 via the inverter 15 such that a target torque corresponding to the accelerator pedal operation amount, and the like, may be obtained.

In the fuel cell system 10 according to the present embodiment, the FC boost converter 12 is provided between the fuel cell 11 and the inverter 15, so the terminal voltage of the fuel cell 11 may be boosted and supplied to the inverter 15 (motor 16). Therefore, the size of the fuel cell system 10 is reduced by, for example, reducing the number of cell stacks in the fuel cell 11. By so doing, the weight of the vehicle WV is reduced, thus further improving the energy efficiency of the vehicle WV.

Incidentally, in the thus configured fuel cell system 10, the power-generating fuel cell 11 is a main power supply for the motor 16. Thus, it is presumable that reducing a power loss in the FC boost converter 12 interposed between the fuel cell 11 and the inverter 15 significantly contributes to improvement in the efficiency of the fuel cell system 10 as a whole. Then, in the fuel cell system 10 according to the present embodiment, the FC boost converter 12 is subjected to intermittent operation control to thereby suppress a switching loss in the FC boost converter 12 as much as possible. By so doing, the efficiency of the system improves.

Here, the condition for stopping the boost operation of the FC boost converter 12 in the intermittent operation control over the FC boost converter 12 is that both the following conditions (1) and (2) are satisfied. On the other hand, when at least any one of the conditions (1) and (2) is not satisfied, a stop of the boost operation of the FC boost converter 12 is prohibited (that is, the boost operation of the FC boost converter 12 is maintained).

$$VFC > VM\_min \quad \text{Condition (1)}$$

$$VFC > VBAT + \alpha \quad \text{Condition (2)}$$

In the above conditions, VFC denotes the terminal voltage of the fuel cell 11, VBAT denotes the terminal voltage of the battery 13, VM_min denotes the load circuit input lower limit voltage, and $\alpha$ is a constant of which the sign is positive. The load circuit input lower limit voltage VM_min is the input terminal voltage of the inverter 15, set to minimize a loss in the fuel cell system 10 while a torque required of the motor 16 is ensured.

Figure 3:
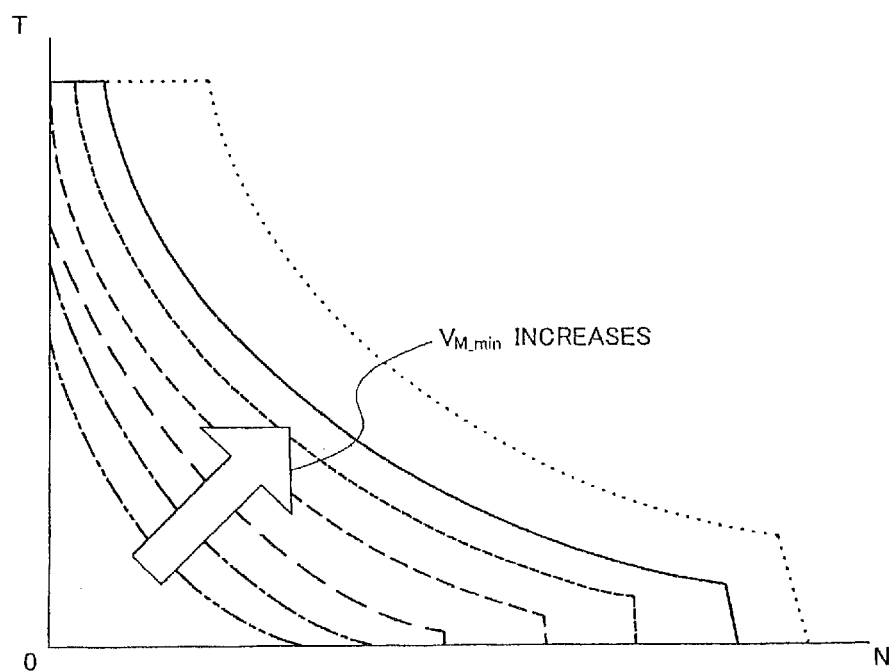
FIG. 3 is a view that schematically shows a map that is used to acquire a load circuit input lower limit voltage VM_min and that is stored in a ROM of a control unit shown in FIG. 1.

FIG. 3 is a view that schematically shows a map that is used to acquire the load circuit input lower limit voltage VM_min and that is stored in the ROM of the control unit 20 shown in FIG. 1. Note that, in FIG. 3, the abscissa axis represents a motor rotation speed N, the ordinate axis represents a motor torque T, and the dotted line at the most upper right side is a maximum torque line indicating a maximum torque that may be generated by the motor 16. As shown in FIG. 3, the load circuit input lower limit voltage VM_min is acquired from the map shown in FIG. 3 on the basis of the motor rotation speed N and the motor torque T.

Figure 4:
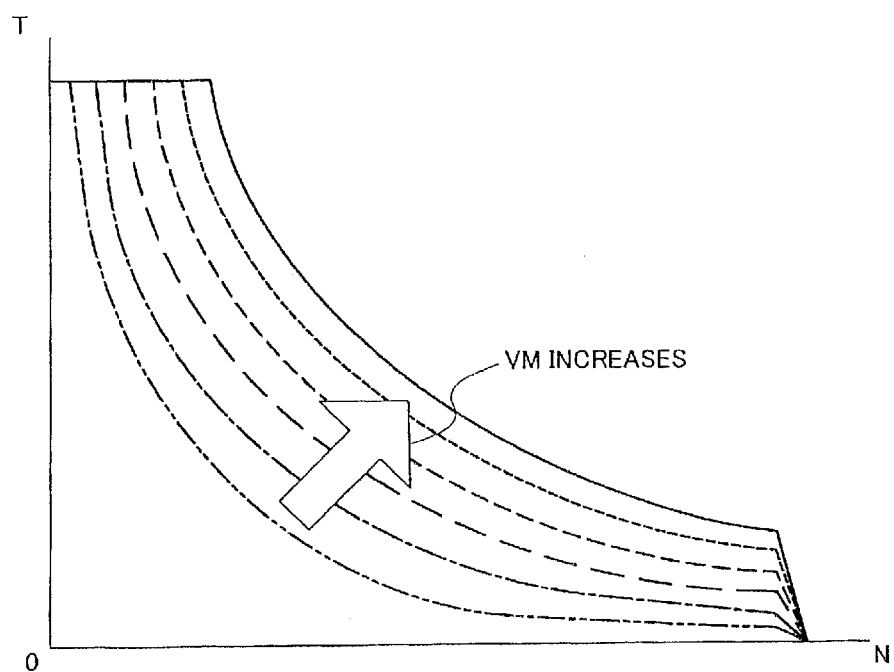
FIG. 4 is a reference view for illustrating the process of deriving the map that is used to acquire the load circuit input lower limit voltage VM_min and that is shown in FIG. 3.
Figure 5:
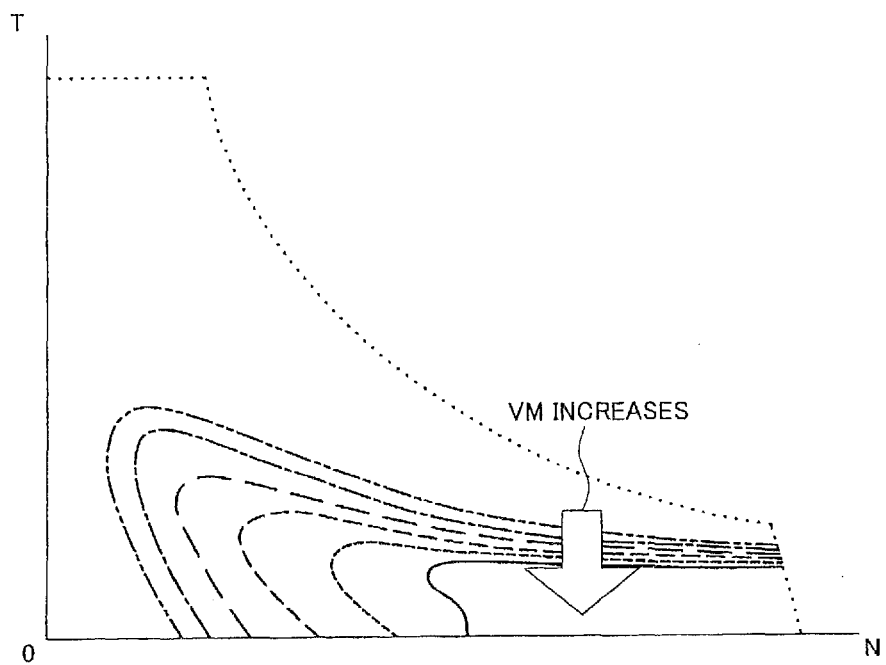
FIG. 5 is a reference view for illustrating the process of deriving the map that is used to acquire the load circuit input lower limit voltage VM_min and that is shown in FIG. 3.

FIG. 4 and FIG. 5 are reference views for illustrating the process of deriving the map that is used to acquire the load circuit input lower limit voltage VM_min and that is shown in FIG. 3. The map shown in FIG. 3 is calculated on the basis of a generatable upper limit torque of the motor 16 (see FIG. 4, and the solid line in FIG. 4 is the same as the maximum torque line shown in FIG. 3) and the loss characteristics of the fuel cell system 10 at the operating points of the fuel cell 11. The generatable upper limit torque of the motor 16 is based on an inverter voltage VM and the motor rotation speed N. The inverter voltage VM is the input terminal voltage of the inverter 15.

Here, a switching loss in each of the FC boost converter 12, the battery boost converter 14 and the inverter 15 reduces as an applied voltage decreases. In addition, an iron loss (a hysteresis loss and an eddy-current loss) in the motor 16 also reduces as an applied voltage decreases. That is, in terms of switching losses and an iron loss, losses reduce as the inverter voltage VM decreases.

On the other hand, FIG. 5 is a view that shows operating points having the highest efficiencies at the respective inverter voltages VM with contour lines. As is apparent from FIG. 5, when the inverter voltage VM is decreased, an increase in losses (for example, a copper loss) may conversely occur because of an increase in current. Furthermore, there are also constraints of continuous rated current, which are determined by circuit elements, such as a relay, provided in the FC boost converter 12.

Thus, conceptually, the load circuit input lower limit voltage VM_min is obtained in the following manner. Initially, a minimum inverter voltage VM1 required to drive the motor 16 (the inverter voltage VM at which a required torque T is obtained and the current may be decreased the most within the range that the current does not exceed the continuous rated value) is determined on the basis of a current motor rotation speed N, the required torque T, the map shown in FIG. 4 and the above described continuous rated current. Then, the load circuit input lower limit voltage VM_min is calculated on the basis of the inverter voltage VM1 and the loss characteristics at the respective operating points (FIG. 5, and the like). Specifically, for example, when the efficiency of the system improves in the case where the voltage is increased by a small amount ΔVM from the thus determined inverter voltage VM1, a new value added with ΔVM is determined as a new inverter voltage VM1. By repeating this calculation, the load circuit input lower limit voltage VM_min is finally obtained. That is, the map of FIG. 3 may be regarded that the map of FIG. 4 is corrected by the map of FIG. 5, and the like.

Specific Example of Operation

Figure 6:
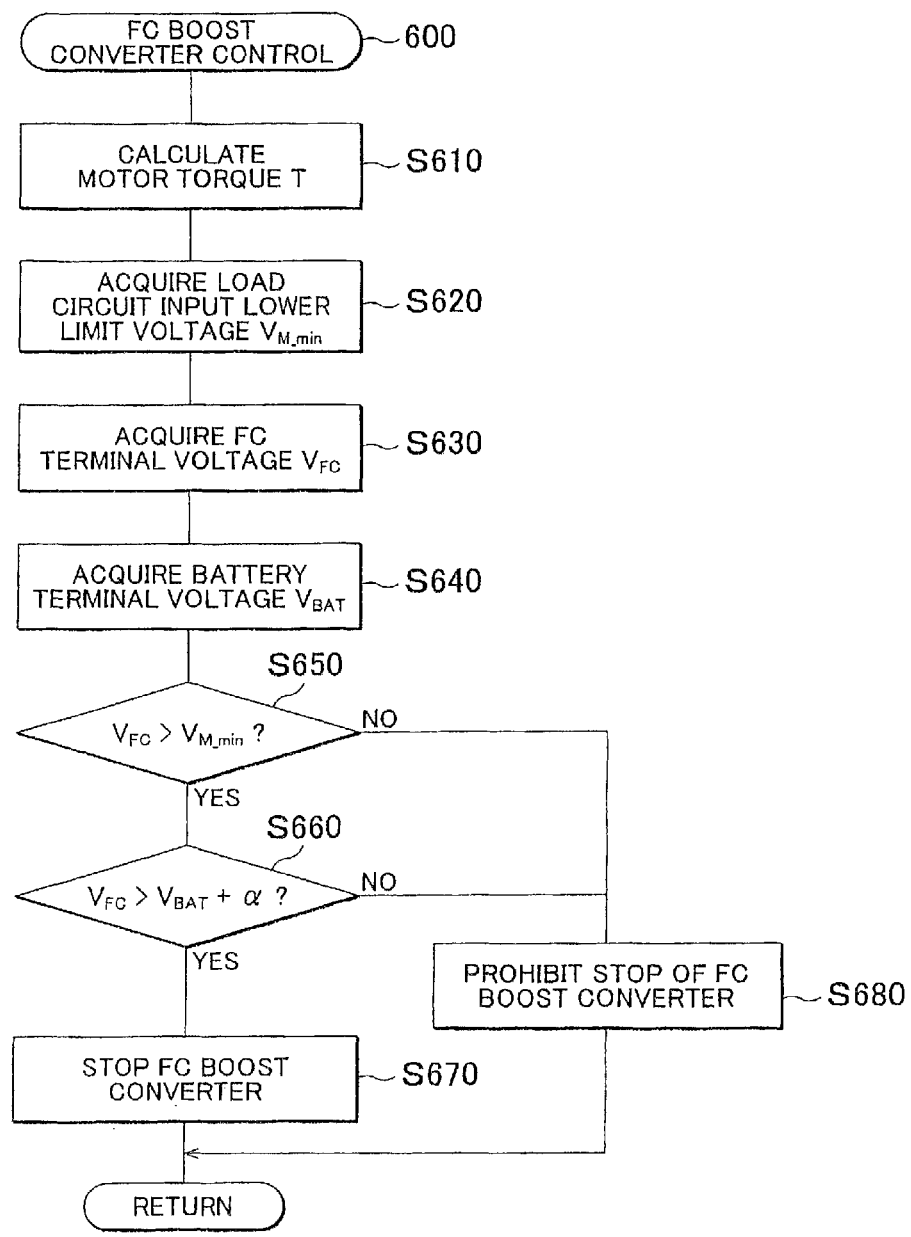
FIG. 6 is a flow chart that shows a specific example of the operation control process of the FC boost converter, executed by a CPU of the control unit shown in FIG. 1.

FIG. 6 is a flow chart that shows a specific example of the operation control process of the FC boost converter 12, executed by the CPU of the control unit 20 (hereinafter, simply referred to as "CPU") shown in FIG. 1. Note that, in the flow chart shown in FIG. 6, "step" is abbreviated as "S".

The CPU executes an FC boost converter control routine 600 shown in FIG. 6 at predetermined time intervals. When the routine 600 is started, the CPU initially calculates a motor torque T on the basis of the current motor rotation speed N, the accelerator pedal operation amount, and the like, in step 610. Then, the CPU acquires the load circuit input lower limit voltage VM_min on the basis of the motor rotation speed N and the motor torque T in step 620 as described above. Subsequently, the CPU acquires the fuel cell terminal voltage VFC in step 630, and acquires the battery terminal voltage VBAT in step 640.

After that, the CPU determines in step 650 whether the above described condition (1) is satisfied. When the condition (1) is satisfied (Yes in step 650), the process proceeds to step 660, and then the CPU determines whether the above described condition (2) is satisfied. When the condition (2) is satisfied (Yes in step 660), the process proceeds to step 670, and then the CPU stops switching operation in the FC boost converter 12, after which the CPU once ends the routine. On the other hand, when at least any one of the condition (1) and the condition (2) is not satisfied, the process proceeds to step 680, and then the CPU prohibits a stop of switching operation in the FC boost converter 12, after which the CPU once ends the routine.

Operation and Advantageous Effects

When the condition (1) is satisfied, that is, when the fuel cell terminal voltage VFC is higher than the load circuit input lower limit voltage VM_min, the output of the fuel cell 11 may be directly transmitted to the input terminal of the inverter 15 while the boost operation of the FC boost converter 12 is stopped (that is, without boosting the terminal voltage of the fuel cell 11).

In addition, when the condition (2) is satisfied, the output-side voltage of the battery boost converter 14 is stably controllable with respect to the input-side voltage of the battery boost converter 14. Therefore, in the case where the condition (2) is satisfied, even when the boost operation of the FC boost converter 12 is stopped (that is, even in a state where the input terminal voltage of the inverter 15 is not controlled by the FC boost converter 12), the input terminal voltage of the inverter 15 may be stably controlled by the battery boost converter 14.

Then, in the fuel cell system 10 according to the present embodiment, when the condition (1) is satisfied and the condition (2) is satisfied, the boost operation of the PC boost converter 12 is stopped, and the output of the fuel cell 11 is directly transmitted to the inverter 15. By so doing, a switching loss that is originally supposed to occur in the FC boost converter 12 is reduced, so the efficiency of the system improves. In addition, the input terminal voltage of the inverter 15 and the terminal voltage of the fuel cell 11 directly electrically connected to the input terminal may be stably controlled by the battery boost converter 14.

On the other hand, when the condition (1) is not satisfied, it is necessary to boost the terminal voltage of the fuel cell 11. In addition, when the condition (1) is satisfied but when the condition (2) is not satisfied, the output-side voltage of the battery boost converter 14 is not stably controllable with respect to the input-side voltage of the battery boost converter 14. Therefore, when the FC boost converter 12 is stopped in the case where the condition (2) is not satisfied, the input terminal voltage of the inverter 15 and the terminal voltage of the fuel cell 11 directly electrically connected to the input terminal cannot be stably controlled.

Then, in the fuel cell system 10 according to the present embodiment, when at least any one of the condition (1) and the condition (2) is not satisfied, a stop of the boost operation of the PC boost converter 12 is prohibited. Thus, in this case, the input terminal voltage of the inverter 15 is controlled through the operation of the FC boost converter 12 (and the battery boost converter 14).

In this way, with the fuel cell system 10 according to the present embodiment, the input terminal voltage of the inverter 15 and the terminal voltage of the fuel cell 11 are appropriately controlled, thus achieving the appropriate efficiency of the system. In addition, the boost DC-DC converters are used as the voltage converters respectively connected to the fuel cell 11 and the battery 13 to thereby make it possible to reduce the number of switching elements inside the device as much as possible. Thus, simplification of the device configuration and further improvement in the efficiency of the system are achieved.

Modifications

Note that the above described embodiment just merely illustrates a typical embodiment of the aspect of the invention. Thus, the aspect of the invention is not limited to the above described embodiment. Thus, of course, the above described embodiment may be modified into various forms without departing from the essence of the invention.

Hereinafter, some typical modifications will be described. Of course, modifications are not limited to the ones listed below. In addition, a combination of two or more modifications may also be applied where appropriate without any technical contradiction from the scope of the invention.

The aspect of the invention should not be interpreted restrictively on the basis of the above described embodiment and the modifications described below.

The aspect of the invention is not limited to the specific device configuration described in the above embodiment. For example, the aspect of the invention is not limited to a vehicle equipped with a fuel cell system. In addition, the "electrical storage device" according to the aspect of the invention is not limited to the battery. Specifically, for example, a capacitor, or the like, may be utilized as the "electrical storage device". Furthermore, the aspect of the invention may be appropriately applied to a configuration in which a plurality of fuel cell stacks or a plurality of electrical storage devices are provided.

The aspect of the invention is not limited to the specific process described in the above embodiment. For example, the parameter acquired from the map may be obtained through calculation:

In order to appropriately control the operating points (particularly, the terminal voltage) of the fuel cell 11, the battery boost converter 14 is desirably constantly operating when the fuel cell 11 outputs electric power. By so doing, a malfunction, such as sintering, due to an increase in the terminal voltage of the fuel cell 11 to near an open terminal voltage is avoided as much as possible. In terms of this point, when the fuel cell 11 outputs electric power, the fuel cell system 10 is desirably controlled such that the input terminal voltage of the inverter 15 is not lower than a lower limit voltage at or above which voltage control can he executed by the battery boost converter 14.

Other than the above, of course, modifications not specifically described are also included in the scope of the invention without departing from the essence of the invention. In addition, the operational and functional elements described in the aspect of the invention not only include specific structures described in the embodiment and modifications but also any structures that are able to implement the operations and functions. Furthermore, the description (including the specification and the drawings) of the publications cited in this specification may be used to constitute part of this specification.

What is claimed is:

1. A fuel cell system comprising:
    a motor;
    a fuel cell and an electrical storage device that are connected to the motor in parallel with each other;
    a first voltage converter that is provided between the motor and the fuel cell and that boosts and outputs a terminal voltage of the fuel cell, input to the first voltage converter;
    a second voltage converter that is provided between the motor and the electrical storage device, a terminal voltage VBAT of the electrical storage device being input to the second voltage converter, the second voltage converter being configured to boost the terminal voltage VBAT to a voltage that is equal to or larger than VBAT+$\alpha$, and the $\alpha$ being a constant of which the sign is positive;
    a load circuit that is provided between the motor and both the first voltage converter and the second voltage converter, wherein electric power output from at least one of the fuel cell and the electrical storage device is supplied to the motor via the load circuit; and
    a control unit that stops boost operation of the first voltage converter and directly transmits an output of the fuel cell to the load circuit when conditions VFC>VM_min and VFC>VBAT+$\alpha$ are satisfied whereas the control unit prohibits a stop of the boost operation of the first voltage converter when the conditions are not satisfied,
    wherein in the conditions, VFC is the terminal voltage of the fuel cell, and VM_min is a load circuit input lower limit voltage, which is an input terminal voltage of the load circuit, set to ensure a torque required of the motor.

2. The fuel cell system according to claim 1, wherein the load circuit input lower limit voltage VM min is set to minimize a loss in the fuel cell system.

3. A control method for a fuel cell system that includes a motor, a fuel cell and an electrical storage device that are connected to the motor in parallel with each other, a first voltage converter that is provided between the motor and the fuel cell and that boosts and outputs a terminal voltage of the fuel cell, input to the first voltage converter, a second voltage converter that is provided between the motor and the electrical storage device, a terminal voltage VBAT of the electrical storage device being input to the second voltage converter, the second voltage converter being configured to boost the terminal voltage VBAT to a voltage that is equal to or larger than VBAT+$\alpha$, and the $\alpha$ being a constant of which the skin is positive, and a load circuit that is provided between the motor and both the first voltage converter and the second voltage converter, the control method comprising:
    supplying electric power, output from at least one of the fuel cell and the electrical storage device, to the motor via the load circuit; and
    stopping boost operation of the first voltage converter and directly transmitting an output of the fuel cell to the load circuit when conditions VFC>VM_min and VFC>VBAT+$\alpha$ are satisfied whereas prohibiting a stop of the boost operation of the first voltage converter when the conditions are not satisfied,
    wherein in the conditions, VFC is the terminal voltage of the fuel cell, and VM_min is a load circuit input lower limit voltage, which is an input terminal voltage of the load circuit, set to ensure a torque required of the motor.

4. The control method according to claim 3, wherein the load circuit input lower limit voltage VM min is set to minimize a loss in the fuel cell system.

* * * * *

UNITED STATES PATENT AND TRADEMARK OFFICE
CERTIFICATE OF CORRECTION

| | |
|---|---|
| PATENT NO. | : 9,083,266 B2 |
| APPLICATION NO. | : 14/129431 |
| DATED | : July 14, 2015 |
| INVENTOR(S) | : S. Kajiwara et al. |

It is certified that error appears in the above-identified patent and that said Letters Patent is hereby corrected as shown below:

In the specification

At column 7, line 64, change "operation of the PC boost" to -- operation of the FC boost --

At column 9, line 9, change "can he executed" to -- can be executed --

In the claims

At claim 2, column 10, line 10, change "voltage VM min" to -- voltage $VM\_min$ --

At claim 3, column 10, line 24, change "the skin is positive" to -- the sign is positive --

At claim 4, column 10, line 43, change "voltage VM min" to -- voltage $VM\_min$ --

Signed and Sealed this
Seventh Day of June, 2016

Michelle K. Lee
*Director of the United States Patent and Trademark Office*